Jan. 24, 1967 M. C. IRISH 3,300,010
ROTATIONAL POSITIONING MEANS
Filed Jan. 25, 1965 3 Sheets-Sheet 2
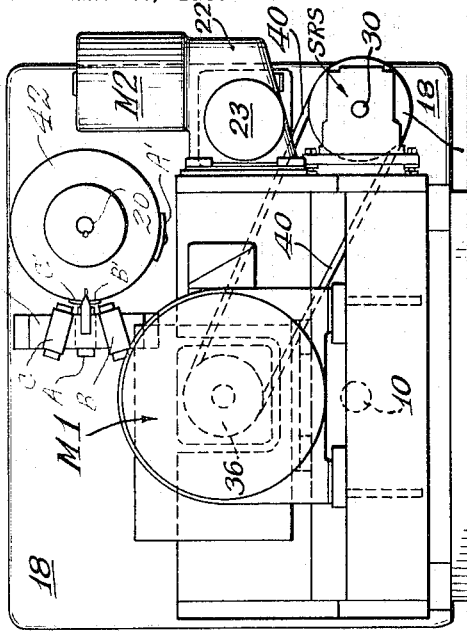
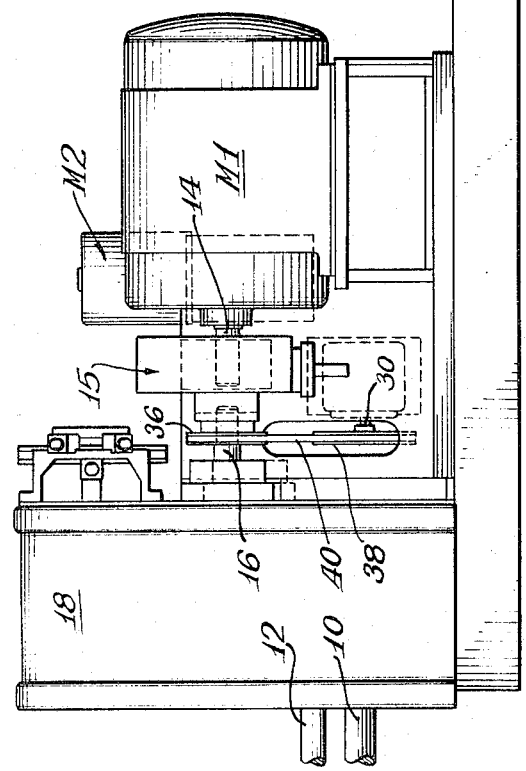
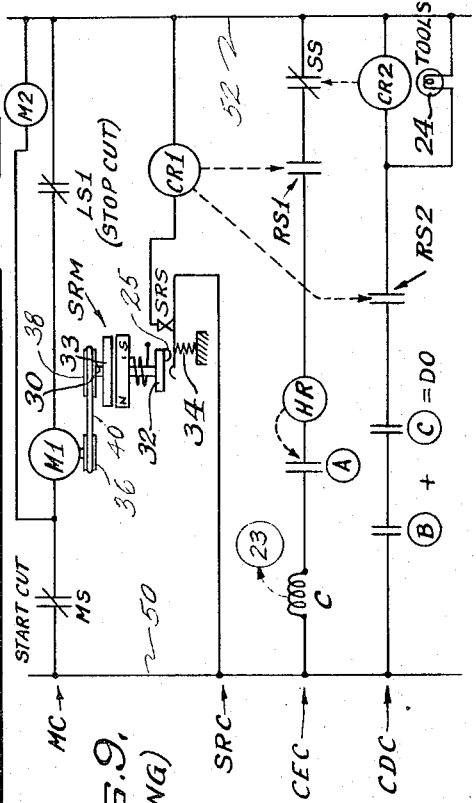
Inventor:
Meral Calvin Irish

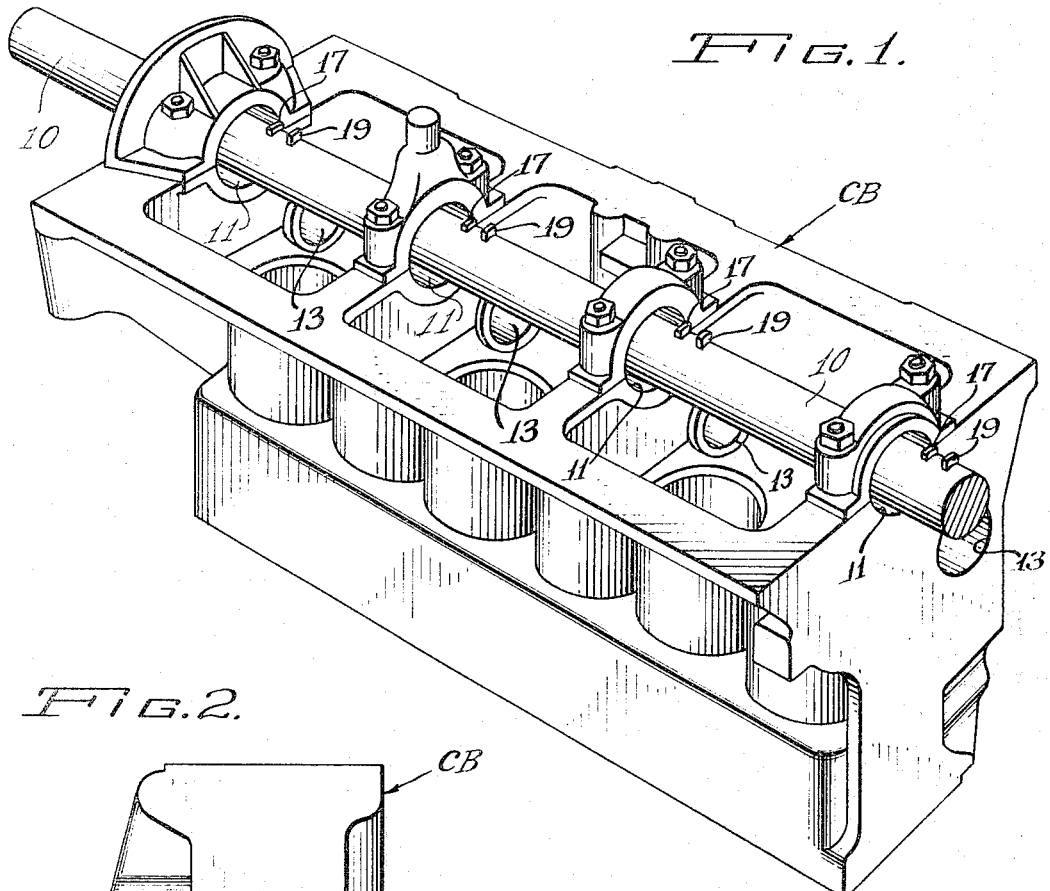
Fig.1.
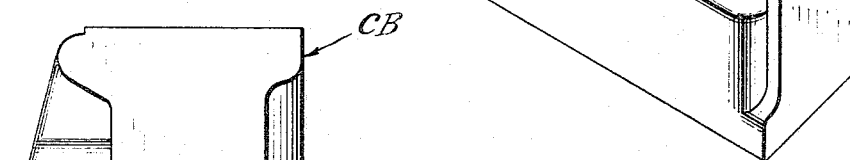
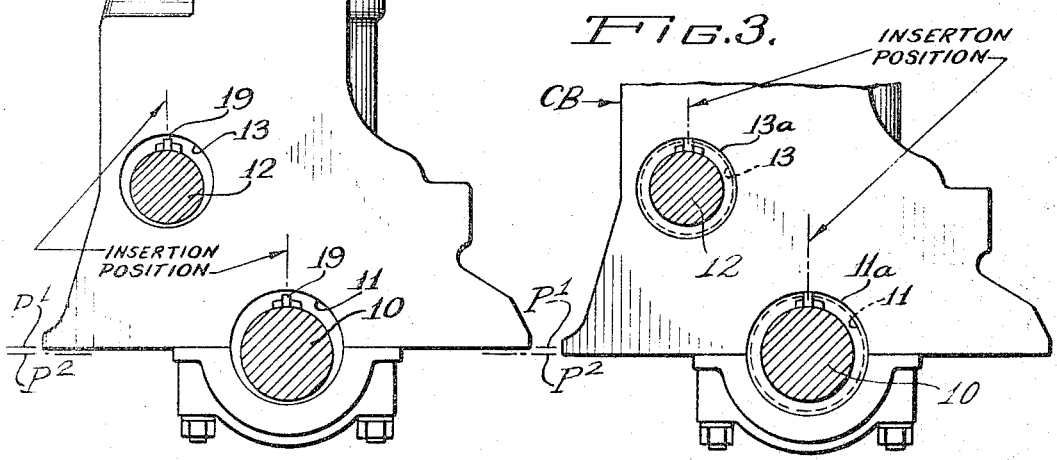
Fig.2.
Fig.3.
Inventor:
Meral Calvin Irish
By Bair, Freeman &
Molinare Attys.

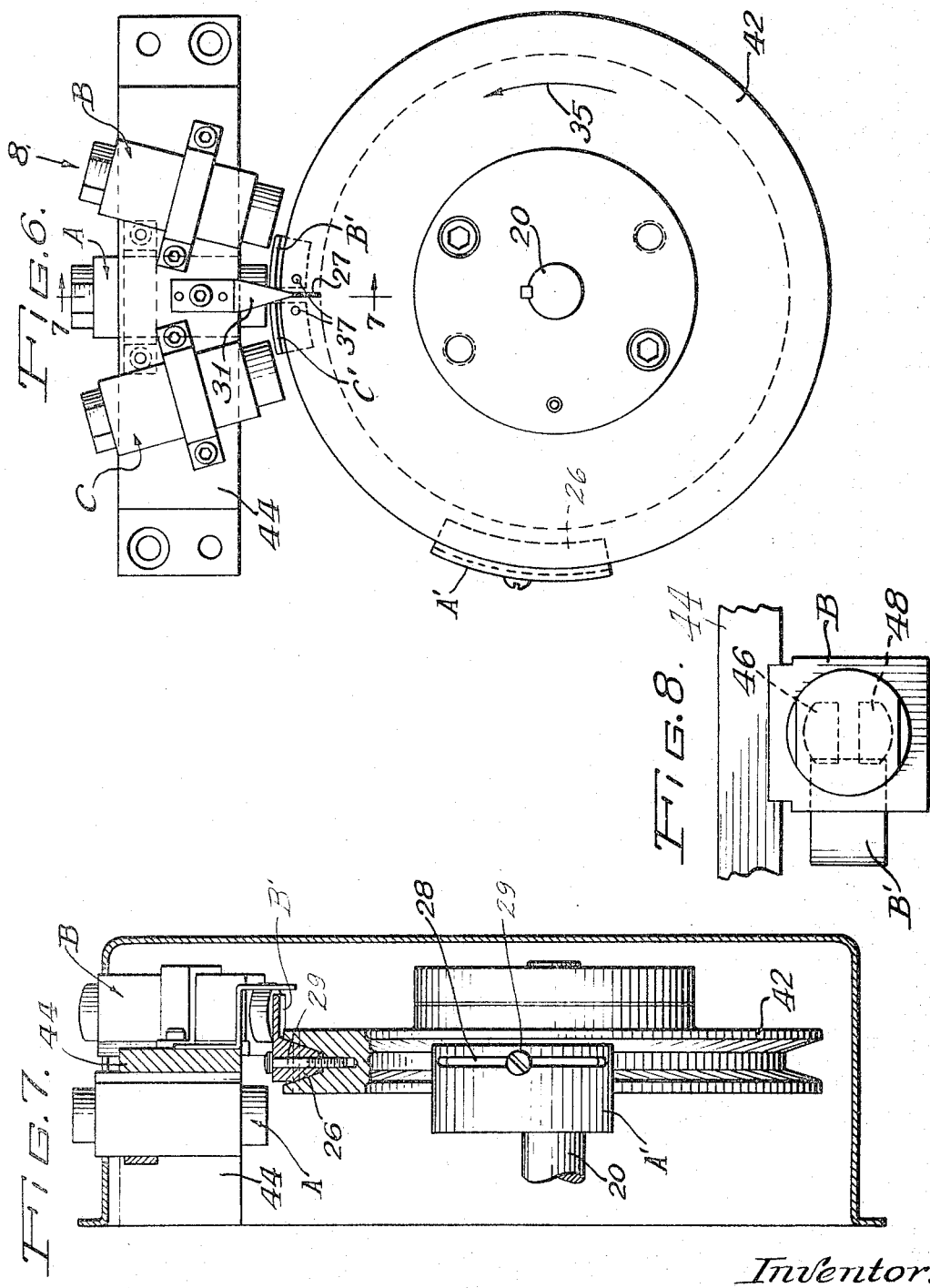

United States Patent Office 3,300,010
Patented Jan. 24, 1967

3,300,010
ROTATIONAL POSITIONING MEANS
Meral Calvin Irish, Richmond, Ind., assignor to National Automatic Tool Company, Inc., Richmond, Ind., a corporation of Indiana
Filed Jan. 25, 1965, Ser. No. 427,689
9 Claims. (Cl. 192—142)

This invention relates to a rotational positioning means for rotary members such a boring bars, shafts or the like, which means is operable to accurately position a reference point on the rotating member rotationally within very close limits.

One object of the invention is to provide rotational positioning means for a member that is rotated for certain operations such as boring out crankshaft and cam shaft holes in a cylinder block, and which is followed by a positioning operation to locate some reference point on the rotating member such as a boring bit on a boring bar at an accurate rotational position so that thereafter other operations dependent upon accurate rotational positioning may be performed such as shifting the cylinder block so that the crankshaft and cam shaft holes are eccentrically related relative to the boring bars therefor with the boring bits aligned with the widest portions of the eccentric spaces between the boring bars and the holes so that the boring bars can be inserted, after which the holes may be centered relative to the boring bars and the boring operations proceeded with.

Another object is to provide rotational positioning means operable at the end of a boring operation to again de-center the cylinder block holes with respect to the boring bars so that the boring bars can be withdrawn without the boring bits scratching the finished surfaces of the holes.

A further object is to provide positioning means comprising a positioning motor in addition to the motor which rotates the boring bars for boring operations, and wherein the positioning motor rotates the boring bars relatively slowly so that they can be accurately stopped at a predetermined position, automatic control means being provided for the positioning motor to take over the rotation of the boring bars at the proper time and position them.

Still a further object is to provide the automatic control means responsive to a reduction in speed of the boring bars as they coast toward stopped position so that takeover by the positioning motor occurs at about the same speed that the boring bars are rotating at the time of takeover.

An additional object is to provide automatic control means which responds to decrease of the speed of rotation of the boring bars or other rotating means to a certain value approximating that of the speed of operation of the boring bars by the positioning motor whereupon the positioning motor is operatively connected to the boring bars and rotates them until a certain position is attained whereupon means responsive to that position renders the positioning motor ineffective to further rotate the boring bars.

Another additional object is to provide automatic control means including an interlocking relay arrangement combined with a rotation-responsive switch for engaging the clutch of a positioning motor whereupon it rotates the boring bars until certain proximity switches actuate another relay when a predetermined position is attained and disengages the clutch or otherwise renders the positioning motor inoperable to further rotate the boring bars.

With these and other objects in view, my invention consists in the construction, arrangement and combination of the various parts of my rotational positioning means, whereby the objects above contemplated are attained, as hereinafter more fully set forth, pointed out in my claims and illustrated in detail on the accompanying drawing, wherein:

FIG. 1 is a perspective view of a cylinder block (upside down for better illustration of a boring bar operationally associated therewith) as one example of work which requires an accurate rotational positioning means, a boring bar being shown in association therewith;

FIG. 2 is an end elevation of the cylinder block of FIG. 1 showing cross sections of a crank shaft boring bar and a cam shaft boring bar in relation to the crankshaft and cam shaft holes of the cylinder block before and while the boring bars are inserted prior to a boring operation (or before and while they are removed after a boring operation);

FIG. 3 is a similar end elevation showing the crankshaft and cam shaft holes of the cylinder block centered with relation to the boring bars as during the boring operation;

FIG. 4 is a side elevation of the two boring bars and mechanism to drive them, and of my rotational positioning means;

FIG. 5 is a front elevation of FIG. 4;

FIG. 6 is an enlargement of a portion of my rotational positioning means;

FIG. 7 is a vertical sectional view on the line 7—7 of FIG. 6 showing details thereof;

FIG. 8 is a plan view of one of the proximity switches of my rotational positioning means looking in the direction of the arrow 8 adjacent FIG. 6, and FIG. 9 is an electro-diagrammatic view of automatic control means for my rotational positioning means.

On the accompanying drawings I have used the reference numeral 10 to indicate a rotating member such as a shaft, or in the illustrated instance a crankshaft hole boring bar. A second boring bar 12 is illustrated for the cam shaft holes of a cylinder block such as shown generally at CB in FIG. 1. The crankshaft holes thereof are shown at 11 and the cam shaft holes at 13.

For rotating the boring bars 10 and 12, a motor M1 is provided (see FIG. 4) from which a motor shaft 14 extends and is operatively connected to an input shaft 16 of a gear box 18. A suitable clutch 15 may be provided as an operative connection between the shafts 14 and 16, and within the gear box 18 suitable gearing which forms no part of my present invention may be provided for reducing the speed of the motor 1 to a speed suitable for rotation of the shafts or boring bars 10 and 12 to attain the desired surface speed of their boring bits 17 and 19. A typical machine tool for performing boring operations on cylinder blocks may have the boring bits 17 for rough cuts followed by 19 for the finished cuts, thereby reducing production time.

Referring to FIG. 2, it is desirable for the boring bars 10 and 12 to be inserted through the holes 11 and 13 in the eccentric position shown where the widest portion of the eccentric area accommodates the bits 17 and 19, the cylinder block CB being at a position designated P1 at this time. After the boring bars are inserted the cylinder block is lowered to the position designated P2 as shown in FIG. 3 so that the boring bars are centered in relation to the openings 10 and 12. Then after the boring operation the openings 10 and 12 are enlarged by the boring bits to the diameters indicated 11ª and 13ª. It is now desirable to again raise the cylinder block to the position designated P1 for withdrawal of the boring bars.

In order to avoid the possibility of the boring tools 17 and 19 being at the wrong position and thereby jamming in the holes 11 and 13 during insertion and removal of the boring bars, and at the same time permit maximum diameter of boring bar to prevent its deflection during operation, the eccentric relationship shown in FIG. 2 should be as small as possible for safety and the boring bars rotationally positioned within a narrow range such as within one or two degrees of an "INSERTION POSITION." Means for accurately attaining this INSERTION POSITION is the primary object of the rotational positioning means which will now be described.

A vane shaft 20 extends from the gear box 18 and is geared therewithin to the input shaft 16 so as to rotate at exactly the same speed as the crankshaft boring bar 10. A vane carrier 42 in the form of a V-pulley is mounted on the shaft 20 and carries a plurality of vanes or armatures A', B' and C'. Each armature has an arcuate shoe 26 (see FIG. 7) to slide in the groove of the V-pulley and the armatures are adjustable in the groove, being slotted as shown at 28 for this purpose and provided with a clamp screw 29 extending through the slot and threaded into the pulley.

Three proximity switches A, B and C are mounted on a switch-mounting block 44 as shown in FIG. 6 and the switch-mounting block is in turn mounted on the gear case 18 as shown in FIG. 5, FIG. 6 being turned 90° clockwise relative to FIG. 5 for convenience in projecting FIG. 7 therefrom. As shown in FIG. 7, the armature A' projects to the left of the plane of the pulley 42 so as to affect only the proximity switch A whereas the armatures B' and C' project toward the right for affecting only the proximity switches B and C. The pulley 42 may be provided with an indicating mark 27 (FIG. 6) and the switch mounting block 44 with a pointer 31 for convenience in adjusting the rotational positioning means as will hereinafter appear.

A second motor M2 (see FIG. 5) is provided for rotating the gearing within the gear box 18 and thereby the boring bars 10 and 12 but at a greatly reduced speed. For this purpose, a worm gear drive 22 and a clutch 23 are associated with the motor M2 which motor is appropriately termed a "positioning motor" for reasons which will later be apparent. For instance the motor M1 may rotate the crankshaft boring bar 10 at a rate of 350 r.p.m. to attain the desired surface speed of operation of the boring bits 17 and 19 thereof and the cam shaft boring bar 12 at 700 r.p.m. whereas the motor M2 may rotate the boring bar 10 at 9 r.p.m. and the boring bar 12 at 18 r.p.m. Rotating at these slow speeds it is quite easy to stop the rotation at a desired point.

In FIG. 5 SRS refers in general to a speed-responsive switch which has a speed-responsive shaft 30. The shaft 30 is driven by a pulley 36 on the shaft 16 which is operatively connected to the shaft 30 by a pulley 38 thereon and a drive belt 40 connecting the two pulleys. The details of the speed-responsive switch SRS will be described later.

Referring to FIG. 9, current supply wires 50 and 52 are shown vertically along the left and right sides of the figure whereas certain circuits shown horizontally may be identified as follows:

MC—Motor circuit
    SRC—Speed responsive circuit
    CEC—Clutch engaging circuit
    CDC—Clutch disengaging circuit In the motor circuit MC, there is a motor switch MS operable to start the cut or boring operation and a limit switch LS1 to stop the cut.

In the speed-responsive circuit SRC there is the speed-responsive switch SRS which is normally closed by a spring 34, but is opened at speeds up to 9 r.p.m. and closes as the motor M1 speeds up beyond 9 r.p.m. The switch then remains closed until the motor slows down to 9 r.p.m. whereupon the speed-responsive switch SRS opens. Speed responsive mechanism SRM is shown which may be in the form of a disc 33 on the speed-responsive shaft 30 subject to magnetic drag with respect to a switch actuator 32 carrying a cam lobe 25 to coact with the switch SRS to open it, switches of this type being known as "plugging switches." The "9 r.p.m." designation is merely by way of example and not intended as a limitation.

The clutch engaging circuit CEC includes a coil C which, when energized, engages the clutch 23 (and may also release a brake) for the motor M2, the brake being normally applied as by a spring or the like. The proximity switch A is in this circuit and also a holding relay for the switch A. A ready switch RS1 is also in this circuit and a stop switch SS. A control relay CR1 is in the speed-responsive circuit SRC and actuates the ready switch RS1.

The clutch disengaging circuit CDC also has a normally open ready switch RS2 therein actuated by the control relay CR1 and has a control relay CR2 for actuating the stop switch SS. Also in the circuit CDC are the proximity switches B and C in series, and a "tools located" indicating light 24 shunting the control relay CR2.

The circuit as shown in FIG. 9 is "RUNNING" and, accordingly, the speed responsive circuit SRC is closed and results in the ready switches RS1 and RS2 being open as shown whereas they are normally closed. The stop switch SS is normally closed which is the condition shown in FIG. 9 since the control relay CR2 is not energized at this time.

The "RUNNING" condition of the circuit may be attained by manual or automatic closure of the motor switch MS so that the motors M1 and M2 are energized and running, and the limit switch LS1 is closed so that at the proper time in the operating sequence it may be opened for stopping the energization of the motor M1 only. This would be after the boring operations are completed and a complete operating circuit would contain the necessary controls for this operation which, however, form no part of my present invention and, therefore, need not be described in detail. If high inertia is involved the motor M1 may be reverse plugged (instead of merely de-energized) in order to reduce speed quickly until the speed responsive switch drops out.

Suffice it to say that when LS1 is opened, the motor M1 is de-energized and the motor as well as the boring bars 10 and 12 coast toward zero speed. When the speed reduces to approximately slightly above 9 r.p.m. the speed responsive switch SRS opens thereby de-energizing the control relay CR1 so that the ready switches RS1 and RS2 close, the object being to have the proximity switch A close sometime during the next 360° of rotation of the vane carrier 42 at which time the speed will be about the same as can be delivered by the relatively small positioning motor M2 to the rotating mechanism. Accordingly, when the switch A closes, the coil C is energized for energizing the clutch 23 between the worm gear drive 22 and the gears in the gear box 18 so that the motor M2 takes over and rotates the boring bars 10 and 12, and the vane pulley 42 at approximately 9 r.p.m. At the same time, the holding relay HR is energized because of closure of the switch A and holds the switch A closed even though the armature A' passes beyond it, and this holding operation remains in effect until the clutch engaging circuit CEC is opened by opening of the stop switch SS when the control relay CR2 is energized.

In FIG. 6 it will be noted that the armature A' is approximately 90° ahead of the armatures C' and B', the direction of rotation being as indicated by the arrow 35. Accordingly, about 90° later the armatures C' and B', attain the position shown in FIG. 6 which is the position that operates both of the proximity switches B and C, thus closing the clutch disengaging circuit CDC and energizing the control relay CR2. Obviously since B and C are in series only one of them would be needed to close the clutch disengaging circuit CDC but two are provided for the important reason of narrowing the differential of operation and providing for a second revolution to accurately bring the boring bars to stop in the INSERTION POSITION of FIGS. 2 and 3 if there is any overrun the first round.

Referring to FIG. 8 the armature B' is in position relative to magnetic poles 46 and 48 of the proximity switch B which will just operate the switch. Likewise the armature C' is just operating the switch C. Accordingly, more than a degree of rotation clockwise or counterclockwise of the vane carrier pulley 42 will open one or the other of the switches and thus the differential of operation for both switches in the circuit CDC is very narrow. It can be widened by adjusting the armatures B' and C' farther apart or narrowed by adjusting them closer together. Desirably the adjustment is within one or two degrees after which the armatures may be pinned as indicated at 37 if desired.

The operation may be summarized as follows:

In FIG. 9 motors M1 and M2 have been energized by the "START CUT" control switch MS shown closed. The speed responsive mechanism SRM is in fast rotating position to permit the speed responsive switch or plugging switch SRS to remain closed so that the control relay CR1 is energized to keep the clutch energizing circuit CEC and the clutch disengaging circuit CDC open until the speed-responsive switch is opened by coasting of the motor M1 and the mechanism SRM to a predetermined low speed after the limit switch LS1 is opened by completion of the boring operation.

When the speed responsive switch opens, the control relay CR1 is de-energized thereby closing the ready switches RS1 and RS2 so that the next time around that the switch A is closed, the coil C will be energized and held energized by the holding relay HR which holds the contacts of the switch A closed even though the armature A' for the switch A goes beyond the switch thereby energizing the clutch coil C for the motor M2 (and may release its brake if provided) so that the motor M2 takes over and rotates the boring bars slowly by reason of the worm gear 22 until the clutch disengaging switches B and C are both closed by the armatures B' and C'.

Thereupon the clutch disengaging circuit CDC is closed through the control relay CR2 to stop the rotation of the boring bar at the INSERTION POSITION illustrated in FIGS. 2 and 3. At the same time, the TOOLS LOCATED light 24 is energized since it is in parallel with the control relay CR2. Energization of the control relay CR2 opens the stop switch SS thereby breaking the clutch engaging circuit CEC to de-energize the clutch coil C which results in the clutch 23 being disengaged (and the brake set if a brake is provided). Alternatively, instead of disengaging a clutch coil, the motor M2 may be de-energized since it will stop within a few degrees because of the worm drive 22. Accordingly, it is my intention in some of my claims to cover these possibilities by referring to means for operatively connecting the motor M2 to a rotary member (such as the boring bar 10) rather than specifying clutch engaging and disengaging means or the like.

The boring bits 17 and 19 are accurately positioned at the INSERTION POSITION by the mechanism and the automatic control means disclosed whereupon the operations of longitudinal insertion to the proper position for boring and then lowering of the engine block from position P1 to position P2 for boring are performed in FIGS. 2 and 3, respectively, by suitable control mechanism and circuits for that purpose which form no part of my present invention and, therefore, are not described in detail. This is standard practice in the machine tool art. Likewise, after a boring operation the positioning of FIG. 2 may be effected to withdraw the tools whereupon the cylinder block may be removed from the machine and another one substituted for boring its crankshaft and cam shaft holes.

From the foregoing specification it will be obvious that I have provided a rotational positioning means which accurately stops a rotating member at a predetermined position within very close limits. The arrangement is such that in case there is any overrun as caused by excessive speed of the rotating member at the time the speed responsive switch cuts out, the positioning motor will rotate the mechanism another revolution and stop it accurately at the INSERTION POSITION. The indicating mark 27 and the pointer 31 shown in FIG. 6 are used during the armature adjusting operation to make sure stoppage occurs when the two are in alignment, which alignment corresponds with the INSERTION POSITION shown in FIGS. 2 and 3.

If the positioning means persists in overrunning, there are two adjustments possible. These two adjustments consist of the armature A' which may be adjusted farther from the armatures C' and B' for overrun or closer to them for underrun, and the tension of the spring 34 of the speed-responsive mechanism SRM in FIG. 9 which can be increased to raise the r.p.m. setting of the switch or decreased to lower the setting. The ideal situation is a combination that permits a narrow differential of operation as between the proximity switches C and B without either overrunning or underrunning. Proximity switches are used instead of mechanically actuated switches as they eliminate any frictional drag and thus increase the accuracy of rotational positioning.

A variety of adjustments can be provided also as between the armatures and the proximity switches. The switches B and C could be adjusted in their position relative to the support 44 but I prefer to adjust the armatures C' and B' with respect to the pulley 42 which can be simply done in the manner illustrated in FIGS. 6 and 7 using a stock V-pulley as a basic mounting for the armatures. At the same time, the armature A' is readily adjusted in respect to its degree of spread relative to the armatures C' and B', thus providing a simple mechanical arrangement for all adjustments required.

Some changes may be made in the construction and arrangement of the parts of my rotational positioning means without departing from the real spirit and purpose of my invention, and it is my intention to cover by my claims any modified forms of structure or use of mechanical equivalents which may reasonably be included within their scope.

I claim as my invention:

1. In combination, a rotary member, a motor for rotating said rotary member during operating periods thereof, and means for rotationally positioning said rotatable member following an operating period comprising a positioning motor, means for operatively connecting said positioning motor to said rotary member, and automatic control means for rendering said operatively connecting means operative after said first mentioned motor is de-energized following an operating period and upon said rotary member coasting to a predetermined speed whereupon said positioning motor further rotates said rotary member through said operative connecting means, said automatic control means being responsive to a predetermined position of said rotary member while it is being rotated by said positioning motor and only after said rotary member has coasted to said predetermined speed to render said operative connecting means inoperable, said operative connecting means being electrically operated, said automatic control means comprising a control circuit for said operative connecting means, a speed responsive switch responding to the speed of rotation of said rotating member for effecting such rendering of said operative connecting means operative, the means responsive to predetermined positioning of said rotary member being a position-responsive switch operable to render said operative connecting means inoperative, and said position-responsive switch being of proximity-type to eliminate friction as a drag on said rotating member.

2. In combination, a rotary member, a motor for rotating said rotary member during operating periods thereof, and means for rotationally positioning said rotatable member following an operating period comprising a positioning motor, means for operatively connecting said positioning motor to said rotary member, and automatic control means for rendering said operative connecting means operative after said first mentioned motor is de-energized following an operating period and upon said rotary member coasting to a predetermined speed whereupon said positioning motor further rotates said rotary member through said operative connecting means, said automatic control means being responsive to a predetermined position of said rotary member while it is being rotated by said positioning motor and only after said rotary member has coasted to said predetermined speed to render said operative connecting means inoperable, said operative connecting means being electrically operated, said automatic control means comprising a control circuit for said operative connecting means, a speed responsive switch responding to the speed of rotation of said rotating member for effecting such rendering of said operative connecting means operative, the means responsive to predetermined positioning of said rotary member being a position-responsive switch operable to render said operative connecting means inoperative, and said position-responsive switch being a pair of proximity-type switches in series with each other and both operable only within a narrow circumferential range of rotation of said rotating member.

3. Means for rotationally positioning a rotary member in accordance with claim 1 wherein an armature is provided for operating said proximity switch, a V-grooved pulley is operatively connected with said rotary member for rotation thereby and is adapted to have said armature secured in the V-groove thereof, and said armature is circumferentially adjustable in said groove.

4. Means for rotationally positioning a rotary member in accordance with claim 2 wherein armatures are provided for operating said proximity switches, a V-grooved pulley is operatively connected with said rotary member and is adapted to have said armatures secured in the V-groove thereof, and said armatures are circumferentially adjustable in said groove.

5. Means for rotationally positioning a rotary member in accordance with claim 2 wherein said proximity switches have armatures for operating them, a V-grooved pulley is adapted to have said armatures secured in the V-groove thereof, and means for securing said armatures in said V-groove comprising clamp screws through the armatures and into said pulley, said armatures having shoes arranged lengthwise of said V-groove and provided with slots for said clamp screws to permit of circumferential adjustment of said armatures relative to said pulley.

6. In combination, a rotary member, a motor for rotating said rotary member during operating periods thereof, and means for rotationally positioning said rotatable member following an operating period comprising a positioning motor, means for operatively connecting said positioning motor to said rotary member, and automatic control means for rendering said operative connecting means operative after said first mentioned motor is de-energized following an operating period and upon said rotary member coasting to a predetermined speed whereupon said positioning motor further rotates said rotary member through said operative connecting means, said automatic control means being responsive to a predetermined position of said rotary member while it is being rotated by said positioning motor and only after said rotary member has coasted to said predetermined speed to render said operative connecting means inoperable, said operative connecting means being electrically operated, said automatic control means comprising a control circuit for said operative connecting means, a speed responsive switch responding to the speed of rotation of said rotating member for effecting such rendering of said operative connecting means operative, the means responsive to predetermined positioning of said rotary member being a position-responsive switch operable to render said operative connecting means inoperative, said automatic control means including a switch in the circuit of said operative connecting means which is responsive to the position of said rotary member after said speed responsive switch is actuated by said rotary member at said predetermined speed to effect such rendering of said operative connecting means inoperative, and said switch in the circuit of said operative connecting means is of proximity-type.

7. Means for rotationally positioning a rotary member in accordance with claim 6 wherein an armature is provided for operating said proximity switch, a V-grooved pulley is operatively connected with said rotary member for rotation thereby and is adapted to have said armature secured in the V-groove thereof, and said armature is circumferentially adjustable in said groove.

8. Means for rotationally positioning a rotary member in accordance with claim 6 wherein said proximity switch has an armature for actuating it, a V-grooved pulley is adapted to have said armature secured in the V-groove thereof, and means for securing said armature in said V-groove comprising a clamp screw through the armature and into said pulley, said armature having a shoe arranged lengthwise of said V-groove and provided with a slot for said clamp screw to permit circumferential adjustment of said armature relative to said pulley.

9. In combination, a rotary member, a motor for rotating said rotary member at a relatively high speed during operating periods thereof, and means for rotatably positioning said rotatable member following an operating period comprising a positioning motor for slowly rotating said rotary member, a clutch for operatively connecting said positioning motor to said rotary member, and automatic control means for energizing said clutch after said first mentioned motor is de-energized following an operating period and upon said rotary member coasting to a predetermined slow speed substantially the same as that at which said positioning motor rotates said rotary member, whereupon said positioning motor further rotates said rotary member through said clutch, said automatic control means being thereupon responsive to a predetermined position of said rotary member while it is being rotated by said positioning motor to disengage said clutch.

References Cited by the Examiner
UNITED STATES PATENTS
2,537,269  1/1951  Harding _____ 192—142

DAVID J. WILLIAMOWSKY, *Primary Examiner.*
A. T. McKEON, *Assistant Examiner.*